(12) United States Patent
Requena et al.

(10) Patent No.: US 7,468,983 B2
(45) Date of Patent: Dec. 23, 2008

(54) COMMUNICATION OF CODEC INFORMATION

(75) Inventors: Jose Costa Requena, Helsinki (FI); Esa Jalonen, Espoo (FI)

(73) Assignee: Nokia Corporation, Espoo (FI)

( * ) Notice: Subject to any disclaimer, the term of this patent is extended or adjusted under 35 U.S.C. 154(b) by 835 days.

(21) Appl. No.: 10/153,548

(22) Filed: May 21, 2002

(65) Prior Publication Data

US 2002/0181495 A1 Dec. 5, 2002

(30) Foreign Application Priority Data

May 23, 2001 (FI) .................................. 20011090

(51) Int. Cl.
*H04L 12/56* (2006.01)
(52) U.S. Cl. ...................... 370/401; 370/338; 370/349; 370/465
(58) Field of Classification Search ................. None
See application file for complete search history.

(56) References Cited

U.S. PATENT DOCUMENTS

| | | | |
|---|---|---|---|
| 6,751,477 B1 * | 6/2004 | Alperovich et al. | 455/560 |
| 6,862,276 B1 * | 3/2005 | Abrol et al. | 370/349 |
| 6,885,658 B1 * | 4/2005 | Ress et al. | 370/352 |
| 2002/0062379 A1 * | 5/2002 | Widegren et al. | 709/227 |
| 2004/0076145 A1 * | 4/2004 | Kauhanen et al. | 370/352 |

FOREIGN PATENT DOCUMENTS

| | | |
|---|---|---|
| EP | 0788288 A2 | 8/1997 |
| EP | 0952716 A2 | 10/1999 |
| EP | 0964540 A2 | 12/1999 |
| WO | WO-00/47006 A1 | 8/2000 |
| WO | WO-00/70885 A1 | 11/2000 |
| WO | WO-02/15625 A1 | 2/2002 |

OTHER PUBLICATIONS

3$^{rd}$ Generation Partnership Project; IP Multimedia (IM) Subsystem—Stage 2 (3G TS 23.228 version 2.0.0), Mar. 2001.

* cited by examiner

*Primary Examiner*—Duc C Ho
(74) *Attorney, Agent, or Firm*—Harrington & Smith, PC (57) ABSTRACT

The invention relates to a method for communicating codec related information between a first mobile communication device (UE1) and a second mobile communication device (UE2) via a network. The codec related information relates to operational modes of an adaptive multi-rate (AMR) codec. The information is transmitted by the first mobile communication device (UE1) to the second mobile communication device (UE2) in a form of a binary mask in an SDP (Session Description Protocol) body (33) of a SIP (Session Initiation Protocol) INVITE message (31), a value of 1 indicating the operational modes which are supported by the first mobile communication device (UE1). In the event that the network does not support at least one of the operational modes that the codec related information indicates as being supported the network modifies the codec related information accordingly.

21 Claims, 7 Drawing Sheets

SDP

33 m = audio 25170 RTP/AVP 3, 4, 97       52 a = ftmp:97 mode_set = 0,1,2,3,4,5,6,7/99,35

COMMUNICATION OF CODEC INFORMATION

FIELD OF THE INVENTION

The invention relates to communicating codec related information between a first communication device and a second communication device via a network.

BACKGROUND OF THE INVENTION

In wireless telecommunication systems information is transferred in an encoded form between a transmitting communication device and a receiving communication device. The transmitting communication device encodes original information into encoded information and sends it to the receiving communication device. The receiving communication device decodes the received encoded information in order to recreate the original information. The encoding and decoding is performed in codecs. Thus, the encoding is performed in a codec located in the transmitting communication device, and the decoding is performed in a codec located in the receiving communication device. However, since there are many different codecs available, the transmitting terminal and the receiving terminal have to agree upon the codec(s) to be used in a session. This agreeing procedure occurs during the initial session establishment and is called a codec negotiation procedure.

The codec negotiation procedure for third generation (3G) telecommunication systems is currently being standardised. One of the standard proposals for a codec negotiation procedure for third generation telecommunication systems is discussed in the following with the aid of FIGS. 1 and 2.

Figure 1:
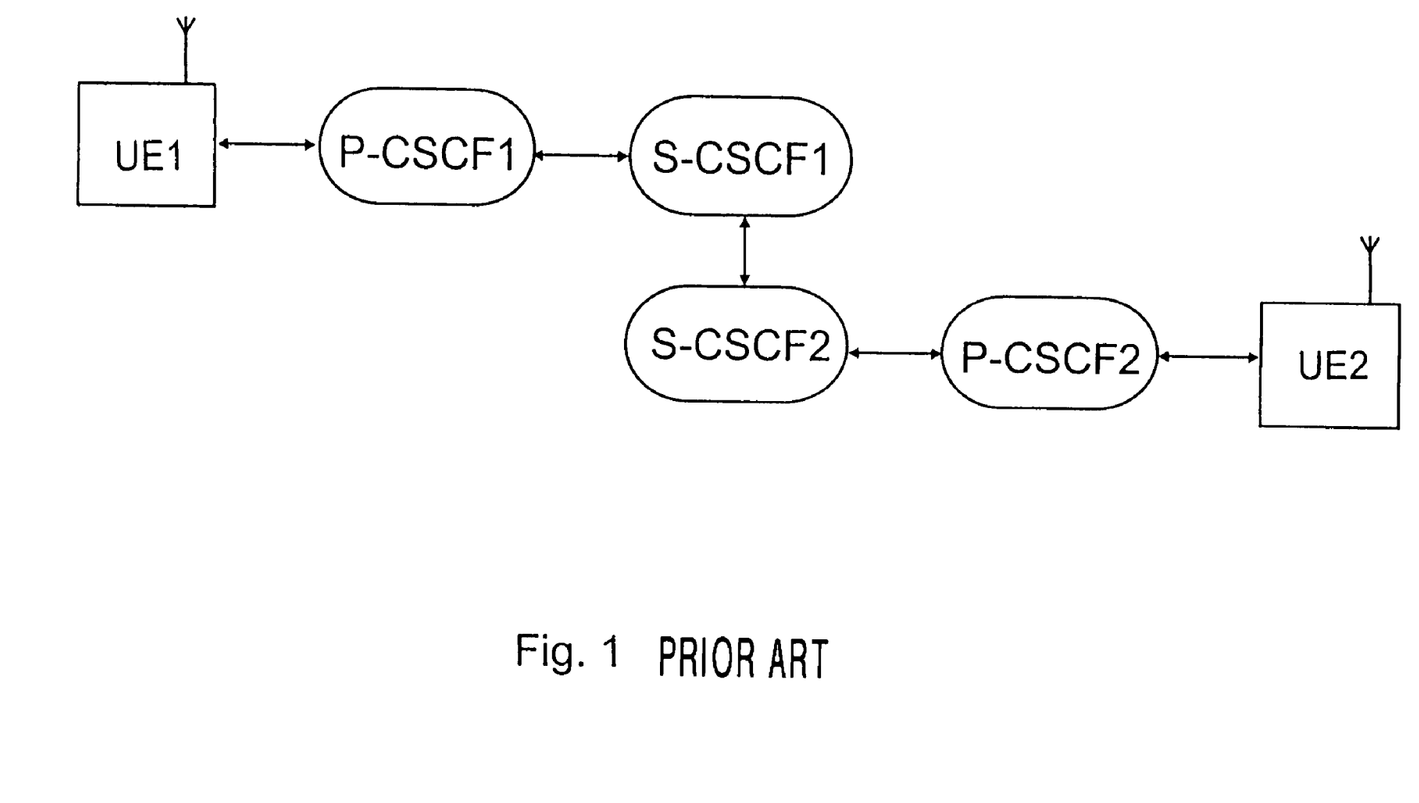
FIG. 1 shows a third generation telecommunication system for providing codec negotiation.

FIG. 1 shows a third generation telecommunication system for providing codec negotiation. In the system there is formed a signalling chain between a first communication device (hereinafter referred as UE1, UE standing for User Equipment) and a second communication device (hereinafter referred as UE2). The signalling chain goes through a first Proxy Call State Control Function (hereinafter referred as P-CSCF1), a first Serving Call State Control Function (hereinafter referred as S-CSCF1), a second Serving Call State Control Function (hereinafter referred as P-CSCF2), a second Proxy Call State Control Function (hereinafter referred as S-CSCF2). P-CSCF1, S-CSCF1, P-CSCF2 and S-CSCF2 are logical network entities that may be implemented so as to form separate physical network elements, or they may be incorporated in some of the already existing physical network elements. P-CSCF1 and S-CSCF1, for example, may be incorporated in a first GGSN (Gateway General Packet Radio Service (GPRS) Support Node), and they may be controlled by a first network operator. P-CSCF2 and S-CSCF2 may be incorporated in a second GGSN, and they may be controlled by a second network operator. Interfaces between the different devices and functions mentioned above are defined in 3GPP ($3^{rd}$ Generation Partnership Project) specifications. It is known to a person skilled in the art that network elements and/or control functions other than the ones shown in FIG. 1 may reside in the system.

The P-CSCF1 and S-CSCF1 are, among other things, responsible for providing services and reserving resources (for example radio resources) for the UE1. The P-CSCF1 controls the UE1 so that it does not exceed the resources that the network is able to provide for it. The S-CSCF1 controls the UE1 so that it does not exceed the resources to which its user has subscribed.

The P-CSCF2 and S-CSCF2 are, among other things, responsible for providing services and reserving resources for the UE2. The P-CSCF2 controls the UE2 so that it does not exceed the resources that the network is able to provide for it. The S-CSCF2 controls the UE2 so that it does not exceed the resources to which its user has subscribed.

When the UE1 initiates a session with the UE2, the codec to be used for the session is to be determined (negotiated). If the session is going to be a multimedia session that is the session is going to be established with more than one media stream (for example an audio stream and a video stream) codecs to be used with each of the streams are to be negotiated.

According to the standard proposal (3G TS 23.228 version 1.7.0) the negotiation is performed in such a way that the UE1 (also referred to as the session originator) first generates, according to the SIP (Session Initiation Protocol) protocol, a SIP INVITE message comprising particular SIP header fields and a message body. According to the proposal, the message body is generated according to the SDP (Session Description Protocol) protocol and it is called an SDP body.

The UE1 generates the SDP body in such a way that it contains a list (set) of codecs that the UE1 is able and willing to support for the session. The UE1 sends the SIP INVITE message to the UE2. When the SIP INVITE message arrives at the UE2, the UE2 responds to the UE1 by generating and sending a reply message, also containing an SDP body, to the UE1. The reply message is referred to in the SIP protocol as the "183 message". The SDP body of the reply message contains a second list of codecs indicating the codecs that the UE2 is able and willing to support for the session. The second list is generated based on the content of the list of codecs in the SDP body of the SIP INVITE message and based on the UE2's ability and willingness to support these codecs. If the UE2 is able and willing to support all the same codecs as the UE1 this results in the second list of codecs being the same as the (original) list of codecs that the UE1 generated in the first place. However, if the UE2 is not able or willing to support, for the session, one or more of the codecs contained in the original list, the UE2 leaves such a codec or such codecs out from the second list. This being the case the second list is a sub-list of the original list. In either case, the second list contains the codecs that both the UE1 and the UE2 are able and willing to support for the session.

When the 183 message, sent by the UE2, arrives at the UE1, the UE1 decides which codec (or codecs if it is a multimedia session) of all of the supported codecs contained in the second list is (or are) to be used in the session. After it has decided this it sends to the UE2 a third message (referred to as the Final SDP) which tells to the UE2 the codec(s) that is (or are) to be used in the session to be established.

However, if the messages are sent in an end-to-end manner as described above a problem arises, because the decision of the codec(s) to be used is made without determining from the network the capacity that it is able to provide. For example, the chosen codec might be such a codec that requires a larger bandwidth than the network is able to provide at the time in question.

One standard proposal tries to solve this problem by allowing the network entities P-CSCF1, S-CSCF1, S-CSCF2 and P-CSCF2 to remove non-suitable codecs from the codec list in the SDP of the SIP INVITE message. In the following the matter is described in more detail referring now to FIG. 2.

Figure 2:
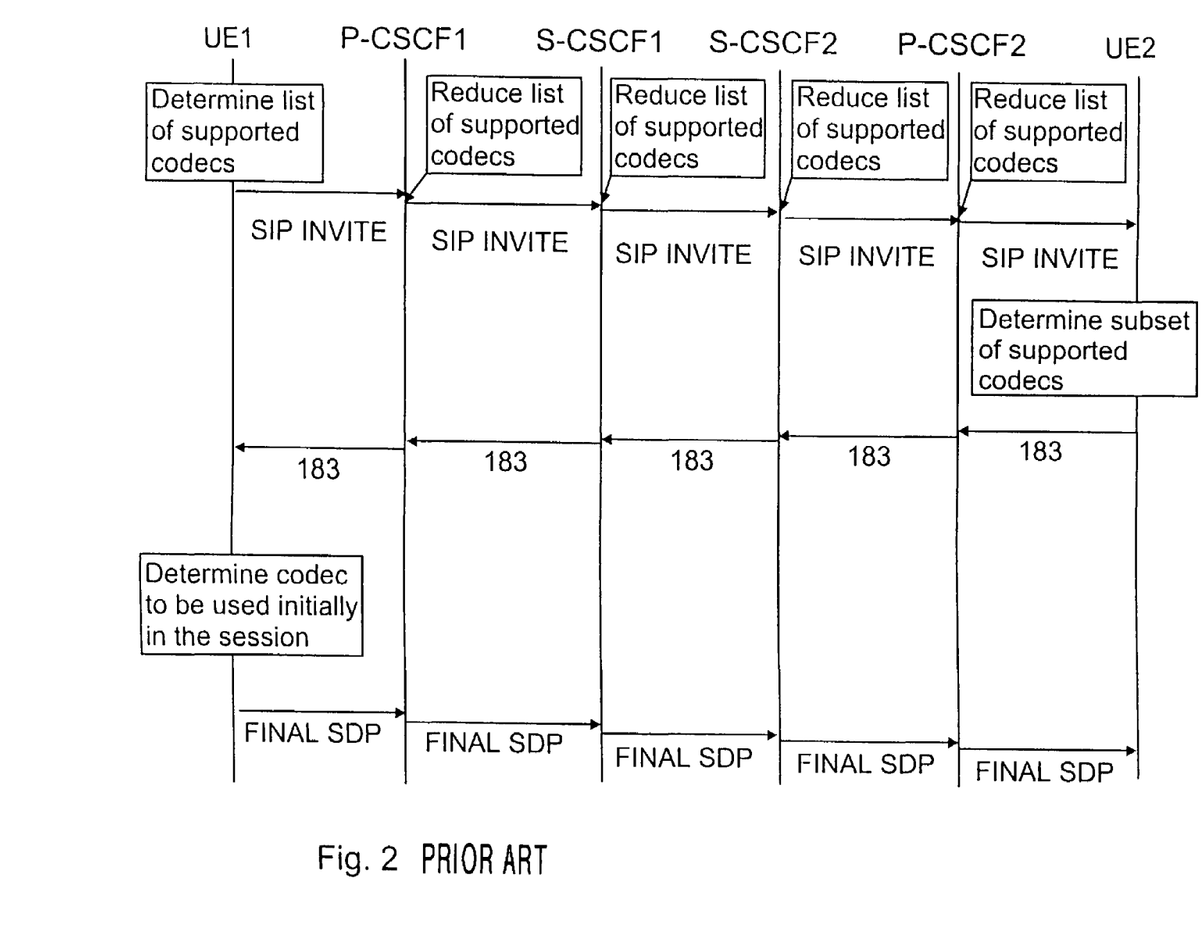
FIG. 2 shows a method for codec negotiation in the system presented in FIG. 1.

After the UE1 has determined the codecs that it supports for the session it sends the SIP INVITE message to the UE2. When the SIP INVITE arrives at the P-CSCF1, on its way to the UE2, the P-CSCF1 removes all non-suitable codec choices from the codec list in the SDP body. By a non-suitable codec choice is meant such a codec in the codec list that is, at the moment (or in general based on a network operator policy), not possible for the session from the network's point of view, the network being the one serving the UE1. One example of a non-suitable codec choice would be a codec that uses too large a bandwidth compared to the bandwidth available in the network.

The P-CSCF1 forwards the message to the S-CSCF1 which removes from the codec list all codecs that the UE1 is not authorised to request (based on user subscription information relating to the user of the UE1).

The S-CSCF1 forwards the message to the S-CSCF2 which removes from the codec list all codecs that the UE2 is not authorised to use (based on user subscription information relating to the user of the UE2).

Also, the S-CSCF1 and S-CSCF2 remove from the codec list all codecs that are not supported based on a network operator policy.

The S-CSCF2 forwards the message to the P-CSCF2 which removes all non-suitable codec choices from the codec list in the SDP body. Again, by a non-suitable codec choice is meant such a codec in the codec list that is, at the moment (or in general based on a network operator policy), not possible for the session from the network's point of view, the network now being the one serving the UE2.

Finally, the P-CSCF2 forwards the SIP INVITE message to the UE2. The UE2 receives the SIP INVITE message containing the SDP body which now comprises a list of codecs which both the UE1 and all the logical network entities P-CSCF1, S-CSCF1, S-CSCF2 and P-CSCF2 are willing to support for the session.

The UE2 now responds with a reply message (that is the 183 message) containing a second list of codecs. The second list is generated based on the content of the list of codecs in the SDP body received in the SIP INVITE message and based on the UE2's ability and willingness to support these codecs. If the UE2 is able and willing to support all the codecs contained in the list of codecs, received in the SIP INVITE message, the second list is the same as the list of codecs, received in the SIP INVITE message. If the UE2 is not able or willing to support, for the session, all the codecs contained in the list of codecs, received in the SIP INVITE message, the UE2 leaves such a codec or such codecs out from the second list. In either cases, the second list is a list of codecs that both the UE1 and the UE2 and all the network entities P-CSCF1, S-CSCF1, S-CSCF2 and P-CSCF2 are willing to support for the session.

When the 183 message arrives at the UE1 it can make a choice which automatically takes into account the network capabilities, when deciding the codec(s) to be used initially in the session. Information on the chosen codec is sent to the UE2 in a Final SDP message, in a manner similar to that previously described.

The method described above only indicates whether a particular codec is supported or not. However, there exist codecs which have multiple options. An AMR (Adaptive Multi Rate) codec, for example, is a codec which supports a plurality of different bit rates. In this case it is not enough in the codec negotiation procedure just to indicate whether the AMR codec is supported, but there is a need to indicate the bit rates of the AMR codec that are supported.

SUMMARY OF THE INVENTION

According to a first aspect of the invention there is provided a method for communicating codec related information between a first communication device and a second communication device via a network the method comprising:
transferring from the first communication device to the second communication device via the network information indicating, from a group of operational modes of a codec, the operational modes that the first communication device supports for a session between the first communication device and the second communication device, the method comprising:
modifying the information, by the network, if the information is not acceptable to the network.

The term session is to be construed broadly. The term session shall cover various sessions and connection services in which codecs are to be used.

Preferably, the network modifies the information if the network does not support at least one of the operational modes which the information indicates as being supported.

Preferably, the information is received by a network entity in the network, and the network entity modifies the information if the network entity does not support at least one of the operational modes that the information, as received, indicates as being supported.

Preferably, the supported and unsupported operational modes are indicated with the aid of a mask having a plurality of mask elements each mask element being representative of one operational mode.

Preferably, each of the plurality of the mask elements indicates whether the corresponding operational mode is supported wherein:
the mask element taking a first value indicates that the operational mode is supported; and
the mask element taking a second value indicates that the operational mode is unsupported.

Preferably, the mask is a binary mask and the mask elements are binary digits so that the first value of a mask element is a binary digit 1 and the second value is a binary digit 0.

Preferably, the information is transferred in a message the message comprising a header portion and a message body the information being transferred in the message body.

Preferably, the message body is an SDP Session Description Protocol) body of a SIP (Session Initiation Protocol) INVITE message.

Preferably, in the method, it is indicated, from a group of operational modes of a codec, the operational modes that the first communication device is willing and able to support for the session between the first communication device and the second communication device.

Preferably, at least one of the communication devices is a mobile communication device.

Preferably, the operational modes of the codec are the operational modes/bit rates of an AMR (Adaptive Multi Rate) codec.

According to a second aspect of the invention there is provided a transmitting communication device for communicating codec related information to a receiving communication device via a network, the transmitting communication device comprising:
a transmitter for transmitting information to the receiving communication device via the network the information indicating, from a group of operational modes of a codec, the operational modes that the transmitting communication device supports for a session between the transmitting communication device and the receiving communication device, the transmitting communication device being configured to:

transmit the information in a format which enables the network to modify the information if the information is not acceptable to the network.

According to a third aspect of the invention there is provided a system for communicating codec related information between a first communication device and a second communication device the system comprising the first communication device, the second communication device and a network, the first communication device comprising:

a transmitter for transmitting information from the first communication device to the second communication device via the network the information indicating, from a group of operational modes of a codec, the operational modes that the first communication device supports for a session between the first communication device and the second communication device, the network comprising:

a processing unit for modifying the information if the information is not acceptable to the network.

According to a fourth aspect of the invention there is provided a message for communicating codec related information between a first communication device and a second communication device via a network the message being configured:

to be transferred from the first communication device to the second communication device via the network the message having information indicating, from a group of operational modes of a codec, the operational modes that the first communication device supports for a session between the first communication device and the second communication device, the message being configured:

to enable the network to modify the information if the information is not acceptable to the network.

According to a fifth aspect of the invention there is provided a computer program product A computer program product for implementing a network entity the computer program product comprising:

computer executable code for enabling the network entity to handle codec related information being transferred between a first communication device and a second communication device the information indicating, from a group of operational modes of a codec, the operational modes that the first communication device supports for a session between the first communication device and the second communication device; and computer executable code for enabling the network entity to modify the information, if the information is not acceptable to the network entity.

It is to be understood that the operational modes that are supported may be indicated indirectly. This can be done, for example, in a system (and constituent parts thereof) which uses operational modes from a fixed, predetermined, set of operational modes. If, for example, operational modes that are not supported are indicated, then the supported operational modes should immediately be apparent.

BRIEF DESCRIPTION OF THE DRAWINGS

Embodiments of the invention will now be described by way of example only with reference to the accompanying drawings in which.

DETAILED DESCRIPTION

The system and message sequence shown in FIGS. 1 and 2 can also be used in a preferred embodiment of the invention. Accordingly, in the preferred embodiment of the invention, a first communication device UE1 first sends to a second communication device UE2 a SIP INVITE message in response to which the UE2 responds with a reply message (for example with a "183 message"). When the UE1 receives the reply message it decides on the codec(s) to be used in a session to be established. The UE1 generates, based on the decision, a third message (Final SDP) and sends the third message containing the information about the decided/chosen codec(s) to the UE2.

In the preferred embodiment the UE1 is a wireless mobile station of a cellular radio network and the UE2 is another wireless mobile station of the same or another cellular radio network. An example of the cellular radio network is a wideband code division multiple access (WCDMA) network or another third generation network.

Figure 3:
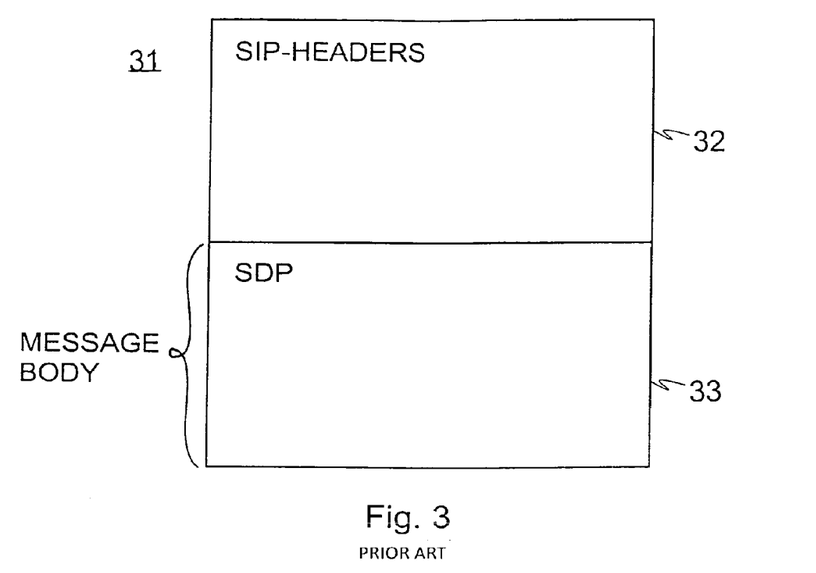
FIG. 3 shows a message structure suitable for codec negotiation.

FIG. 3 shows the basic SIP message structure. This is the basic structure of all the three messages sent in the preferred embodiment. A SIP message 31 comprises SIP header fields 32 and a message body that is an SDP body 33.

The SIP header fields 32 contain information about the sender and the recipient of the message such as address information and other general information familiar to a person skilled in the art.

The SDP body 33 contains information concerning those media streams (for example information on ports and codecs) to be used in a session. Each media stream is defined in the SDP with the aid of one media line that is an m-line. Each media stream may be even more specifically defined with the aid of one or more attribute lines that is one or more a-lines following the m-line.

Let us now assume that the UE1 wants to initiate an audio (speech) session with the UE2. In this exemplary case the UE1 supports the following three codecs for the audio session: the GSM (Global System for Mobile communications) codec, the G.723 codec and the AMR codec. The m-line for this media (in the SDP of the SIP INVITE message) would then be like this:

m=audio 25170 RTP/AVP 3,4,97, wherein audio indicates the media type that is audio stream, 25170 indicates the port number at which the UE1 wants to receive the media, RTP/AVP (Real-Time Transport Protocol/Audio Video Protocol) is the transport protocol to be used and the numbers 3, 4 and 97 indicate the codecs, defined in RTP/AVP, that the UE1 is willing to support for the session. The mappings according to RTP/AVP are such that number 3 indicates the GSM codec, number 4 indicates the G.723 codec and number 97 indicates the AMR codec.

Since the AMR codec has eight different modes of operation so that it can operate with eight different bit rates, these AMR modes/bit rates should also be indicated. According to the preferred embodiment of the invention the bit rates supported are indicated with the aid of an a-line in the SDP body.

The AMR codec itself supports all eight bit rates, but the UE1 might not be able or willing to support all of the bit rates. For example, if UE1 is performing another task simultaneously with the session to be established it may be that the UE1 is not willing to support some of the highest bit rates at the initial stage of the session, although it might, in general, be able to support these bit rates. However, a typical situation is that the UE1 is both able and willing to support all the bit rates.

According to the preferred embodiment of the invention the AMR modes/bit rates supported are indicated in the a-line with the aid of a binary mask. The binary mask is a binary number having as many digits as there are different modes/bit rates. Each binary digit corresponds to a mode/bit rate in such a way that each binary digit 1 corresponds to a supported rate and each binary digit 0 corresponds to a unsupported rate. However, in order to consume less space in the SIP messages the binary mask is expressed as a decimal number in the a-line. It is to be noted, that depending on the implementation either the decimal number presentation or the binary number presentation of the binary mask is actually transmitted with the SIP messages.

In this exemplary case the UE1 supports all the eight rates. Thus, the a-line (in the SDP of the SIP INVITE message) would look like this:

a=fmtp:97 mode_set=0, 1, 2, 3, 4, 5, 6, 7/255, wherein fmtp basically indicates the message body format, 97 indicates that the a-line is for the AMR codec, mode_set=0, 1,2,3,4,5,6,7 indicates the modes/rates that the AMR codec (of the UE1) itself supports whereas the binary mask 255 indicates which of the bit rates (that is modes) are supported by the device UE1. The meaning of numbers 0 to 7 in the mode_set and the use of the binary mask will be explained in greater detail in the following.

In the mode_set-list the numbers 0 to 7 correspond the different AMR codec modes/rates in the following way:

0 ⇔ 12.2 kbps
1 ⇔ 10.2 kbps
2 ⇔ 7.95 kbps
3 ⇔ 7.40 kbps
4 ⇔ 6.70 kbps
5 ⇔ 5.90 kbps
6 ⇔ 5.15 kbps
7 ⇔ 4.75 kbps If a particular mode number is included in the a-line the corresponding mode/bit rate is supported by the AMR codec. Thus, since all the numbers 0 to 7 appear in the list this is to be construed such that the AMR codec of the UE1 supports all eight modes/rates.

Because the UE1 supports all eight rates the binary mask gets the value 11111111 which corresponds to the decimal number 255. The correspondence between binary digits and AMR codec modes/bit rates is as follows:

$$255 = \begin{array}{cccccccc} 1 & 1 & 1 & 1 & 1 & 1 & 1 & 1 \\ | & | & | & | & | & | & | & | \\ 0 & 1 & 2 & 3 & 4 & 5 & 6 & 7 \end{array} \text{ (modes/bit rates).}$$

Thus, the mask indicates that all the AMR codec modes/rates 0 to 7 are supported by the UE1, because in the mask there is a binary digit 1 corresponding to each of the modes/bit rates.

Figure 4A:
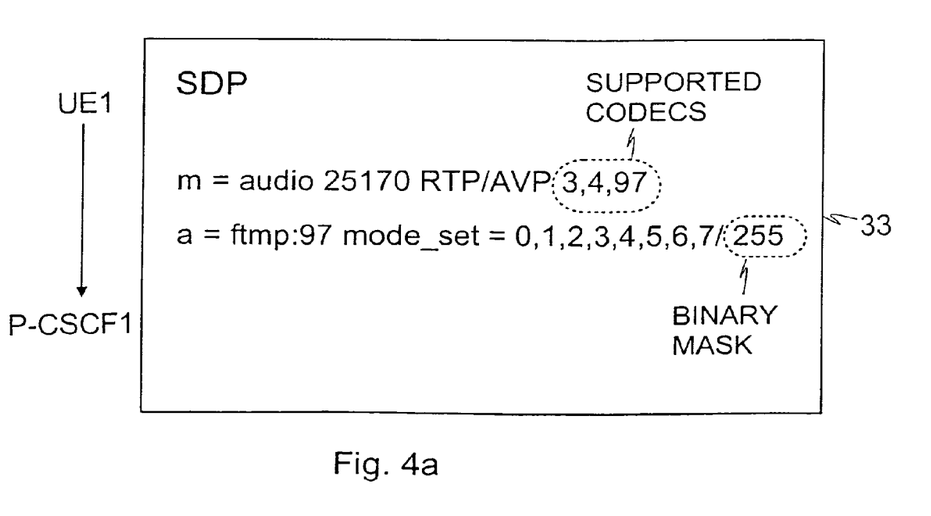
FIGS. 4a to 4e show the content of the message body of a message according to a preferred embodiment of the invention as the message travels through the network.

Now, the UE1 wirelessly sends the SIP INVITE message containing the SDP body comprising the above described m-line and a-line, as shown in FIG. 4a, to the UE2. On its way to the UE2 the network entities P-CSCF1, S-CSCF1, S-CSCF2 and P-CSCF2 remove any non-suitable codec choices from the list of codecs in the m-line.

Relating to the AMR codec, each network entity modifies the mask in the a-line if it does not support one or more of the AMR modes/bit rates that the mask indicates as being supported. A network entity might not support a particular AMR codec mode, if for example, the particular AMR mode would use a larger bandwidth than the network is able to provide at the moment. Alternatively, based on a network operator policy, a particular AMR mode, in general, might not be supported.

The P-CSCF1 receives the SIP INVITE message sent from the UE1. In this exemplary case the P-CSCF1 supports the GSM codec, the G.723 codec and the AMR codec. Relating to the AMR bit rates it supports all bit rates except 12.2 kbps, 7.40 kbps and 5.90 kbps.

In this exemplary case the P-CSCF1 does not modify the m-line, because it supports all codecs that the list contains. However, it has to modify the a-line because it does not support some of the bit rates that the mask indicates as being supported. In other words, the P-CSCF1 changes in the binary mask those binary digits corresponding to the unsupported AMR bit rates 12.2 kbps (mode 0), 7.40 kbps (mode 3) and 5.90 kbps (mode 5) from value 1 to value 0. The modification of the mask is illustrated in the following:

$$255 = \begin{array}{cccccccc} \cancel{1} & 1 & 1 & \cancel{1} & 1 & \cancel{1} & 1 & 1 \\ \downarrow & & & \downarrow & & \downarrow & & \\ 0 & 1 & 1 & 0 & 1 & 0 & 1 & 1 \\ | & | & | & | & | & | & | & | \\ 0 & 1 & 2 & 3 & 4 & 5 & 6 & 7 \end{array}$$
$$107 = \text{ (modes/bit rates).}$$

Figure 4B:
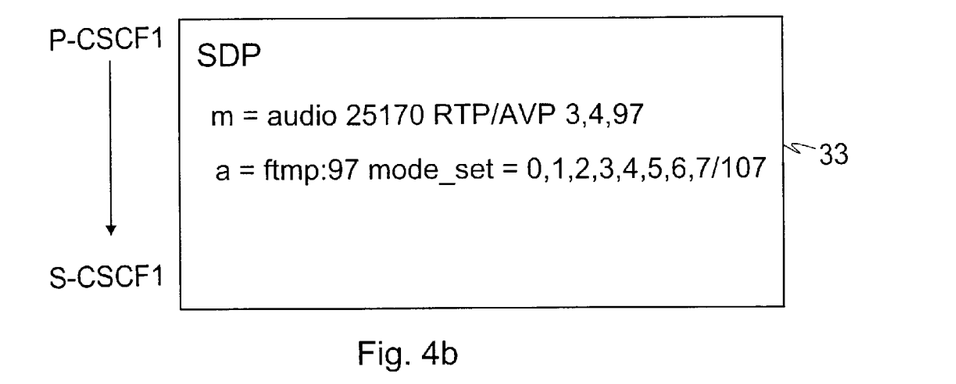

After the modification the a-line of the SDP body of the SIP INVITE message is:

a=fmtp:97 mode_set=0,1,2,3,4,5,6,7/107.

Now, the P-CSCF1 forwards the SIP INVITE message, containing the SDP as illustrated in FIG. 4b, to the S-CSCF1. In this exemplary case the S-CSCF1 supports the GSM codec, the G.723 codec and the AMR codec. Relating to the AMR rates it supports all bit rates except 12.2 kbps and 7.95 kbps.

In this exemplary case the S-CSCF1 does not modify the m-line, because it supports all codecs that the list contains. However, it has to modify the a-line because it does not support some of the AMR modes/bit rates that the mask indicates as being supported.

In other words, the S-CSCF1 changes in the binary mask the binary digit corresponding to the unsupported AMR bit rate 7.95 kbps (mode 2) from value 1 to value 0. Relating to the unsupported bit rate 12.2 kbps (mode 0) the S-CSCF1 does not have to do anything because the binary digit corresponding to that mode/bit rate already has the value 0. The modification of the mask is illustrated in the following:

$$107 = \begin{array}{cccccccc} 0 & 1 & \cancel{1} & 0 & 1 & 0 & 1 & 1 \\ & & \downarrow & & & & & \end{array}$$

Figure 4C:
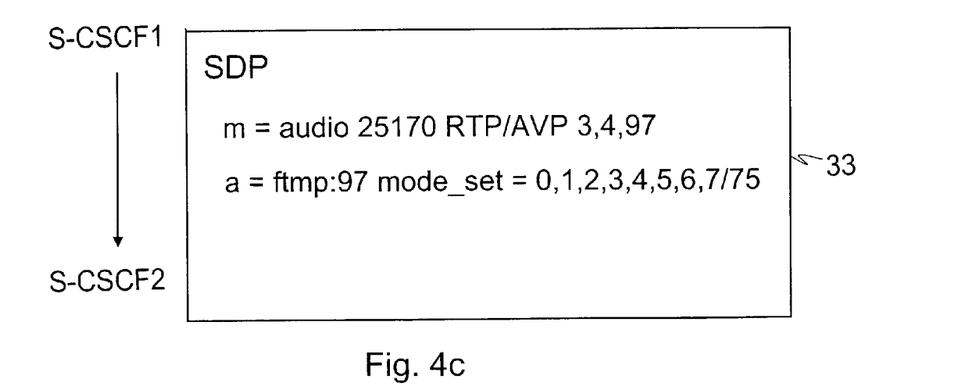

-continued $$75 = \begin{matrix} 0 & 1 & 0 & 0 & 1 & 0 & 1 & 1 \\ | & | & | & | & | & | & | & | \\ 0 & 1 & 2 & 3 & 4 & 5 & 6 & 7 \end{matrix} \text{ (modes/bit rates).}$$

After the modification the a-line of the SDP body of the SIP INVITE message is:
a=fmtp:97 mode_set=0, 1, 2, 3, 4, 5, 6, 7/75.

Now, the S-CSCF1 forwards the SIP INVITE message, containing the SDP as illustrated in FIG. 4c, to the S-CSCF2. In this exemplary case the S-CSCF2 supports the GSM codec, the G.723 codec and the AMR codec. Relating to the AMR rates it supports all other rates except 12.2 kbps and 7.95 kbps. Thus, the S-CSCF2 does not modify the m-line, because it supports all codecs that the list contains, and it does not have to modify the a-line either, because the binary digits corresponding to the unsupported AMR bit rates (modes 0 and 2) already have the value 0 (and thus they are not possible AMR bit rates for the session regardless of the capabilities of the S-CSCF2 since if a bit rate is not supported by at least one party transmission at that bit rate is not possible).

Now, the S-CSCF2 forwards the SIP INVITE message to the P-CSCF2. In this exemplary case the P-CSCF2 supports the GSM codec and the AMR codec but it does not support the G.723 codec. Relating to the AMR bit rates it supports all other rates except 12.2 kbps, 6,70 kbps and 5.90 kbps. Now, the P-CSCF2 has to modify both the m-line and the a-line. It has to modify the m-line because it does not support all codecs that the list in the SDP contains. The P-CSCF2 now simply removes from the codec list the unsupported codec choices. In this exemplary case it removes the number 4 which corresponds to the G.723 codec according to the RTP/AVP profile. After the removal the m-line looks like this:
m=audio 25170 RTP/AVP 3,97.

Figure 4D:
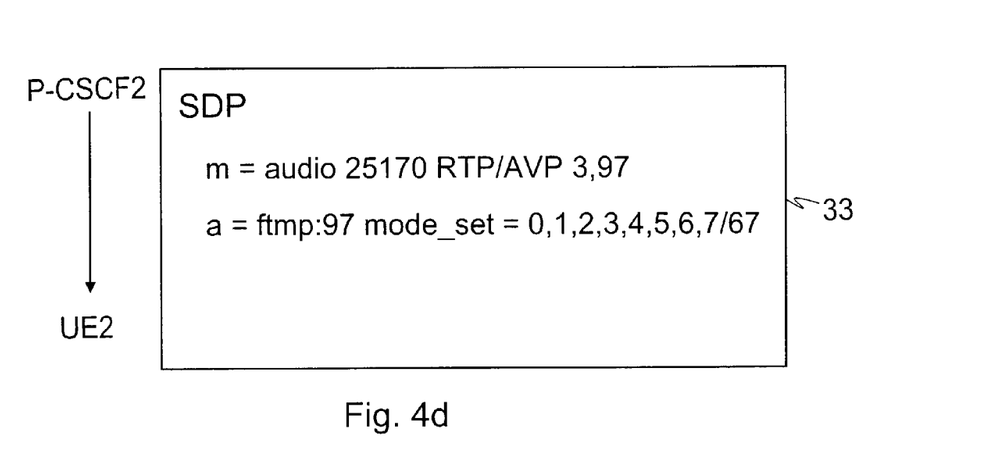

The P-CSCF2 also has to change the a-line because it does not support one of the bit rates that the mask indicates as being supported. The P-CSCF2 changes in the binary mask the binary digit corresponding to the unsupported AMR bit rate 6.70 kbps (mode 4) from value 1 to value 0. Relating to the unsupported bit rates 12.2 kbps (mode 0) and 5.90 kbps (mode 5) the P-CSCF2 does not have to do anything because the binary digits corresponding to these modes/bit rates already have the value 0. The modification of the mask is illustrated in the following:

$$75 = \begin{matrix} 0 & 1 & 0 & 0 & \cancel{1} & 0 & 1 & 1 \\ & & & & \downarrow & & & \end{matrix}$$

$$67 = \begin{matrix} 0 & 1 & 0 & 0 & 0 & 0 & 1 & 1 \\ | & | & | & | & | & | & | & | \\ 0 & 1 & 2 & 3 & 4 & 5 & 6 & 7 \end{matrix} \text{ (modes/bit rates).}$$

After the modification the a-line of the SDP body of the SIP INVITE message is:
a=fmtp:97 mode_set=0, 1, 2, 3, 4, 5, 6, 7/67.

Finally, the P-CSCF2 forwards the SIP INVITE message containing the SDP body comprising the above modified m-line and a-line, as illustrated in FIG. 4d, wirelessly to the UE2.

The UE2 receives the SIP INVITE message. From the content of the SDP (that is from the m-line and the a-line) of the received SIP INVITE message it is directly derivable which of the codecs both the UE1 and all the network entities support for the (audio) session. In this case these codecs are the GSM codec (corresponding to RTP/AVP profile number 3) and the AMR codec (corresponding to RTP/AVP profile number 97). The mode_set in the a-line tells to the UE2 the modes that the AMR codec itself at the other end supports, that is the modes/rates 0 to 7. The mask in the a-line tells to the UE2 which of the AMR codec options (modes/bit rates) are supported by both the UE1 and the network entities. In this case, these are the modes 1 (bit rate 10.2 kbps), 6 (5.15 kbps) and 7 (4.74 kbps).

Figure 4E:
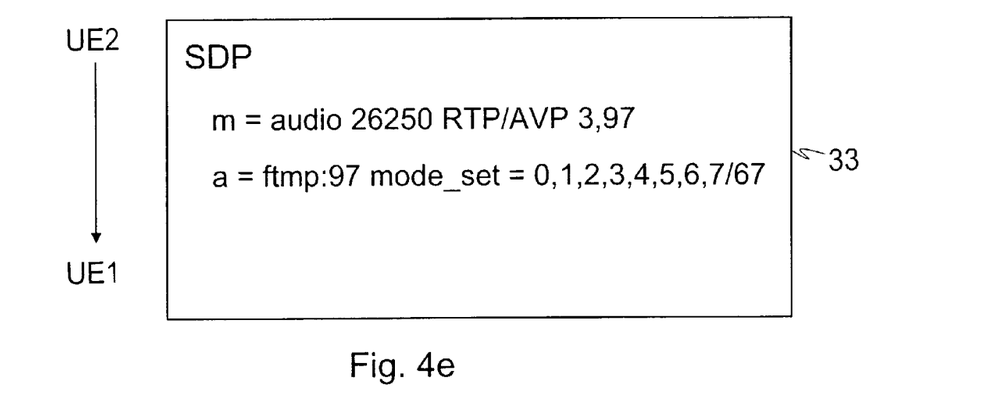

The UE2 now generates the second message which is the reply message (a 183 message or a corresponding message). Again, this is a SIP message containing an SDP body. The reply message is generated based on the content of the received SIP INVITE message and based on the UE2's ability and willingness to support codecs and AMR modes. The reply message also comprises an m-line and an a-line the content of which is generated based on the content of the m-line and a-line of the received SIP INVITE message and based on the properties of the UE2. In this exemplary case the port where the UE2 wants to receive the media (that is audio) stream is the port number 26250. And the codecs that the UE2 supports for the session are: the GSM codec (number 3) and the AMR codec (number 97). Thus, the m-line of the SDP body of the reply message initially looks like this:
m=audio 26250 RTP/AVP 3,97, wherein 26250 indicates the port number at which the UE2 wants to receive the media, RTP/AVP (Real-Time Transport Protocol/Audio Video Protocol) is the transport protocol to be used and the numbers 3 (the GSM codec) and 97 (the AMR codec) indicate the codecs, defined in RTP/AVP, that the UE2 is willing to support for the session.

The AMR codec of the UE2 supports by definition all the AMR modes/bit rates, and, in this case, also the device UE2 itself, supports all AMR modes. This is a typical case. Thus, the content of the a-line of the reply message results in being the same as the a-line in the SDP of the SIP INVITE message as received at the UE2, that is:
a=fmtp:97 mode_set=0, 1, 2, 3, 4, 5, 6, 7/67.

The UE2 sends the reply message, containing the SDP as illustrated in FIG. 4e, to the UE1. Although there should be no need for the network entities to modify the binary mask of the reply message further, it may be possible for the network entities to make such a modification if the situation in the network has changed.

When the UE1 receives the reply message it decides, on the basis of the information contained in the reply message, the codec to be used initially in the (audio) session. In this exemplary case the m-line contains two possible codecs: the GSM codec and the AMR codec, and the UE1 decides that the AMR codec is to be used initially in the session.

The reply message contains also information on possible AMR bit rates. Therefore, it is now possible for the UE1 to decide on the initial AMR source bit rate to be used in the (audio) session. This can be done without any other interaction with the network entities. In this exemplary case the mask in the a-line in the reply message indicates three possible modes/bit rates: 10.2 kbps (mode 1), 5.15 kbps (mode 6) and 4.75 kbps (mode 7), and the UE1 decides that the AMR bit rate 10.2 kbps is to be used initially in the session.

Now, the UE1 generates the third message (Final SDP or a corresponding message). Again, this is a SIP message containing an SDP body. The UE1 includes in the SDP body information concerning which codec is to be used initially in the session. If the chosen codec is the AMR codec, like it is in this case, the UE1 also includes in the SDP body information on which AMR bit rate is to be used initially. Other information relating to codecs may be conveyed in the third message, for example additional information about other bit rates and other codecs that may be used. Thus, if the codec and/or bit rate has to be changed during the established session the possible choices would already be known to the UE1 and the UE2.

In the following, some other embodiments of the invention will be introduced.

Figure 5:
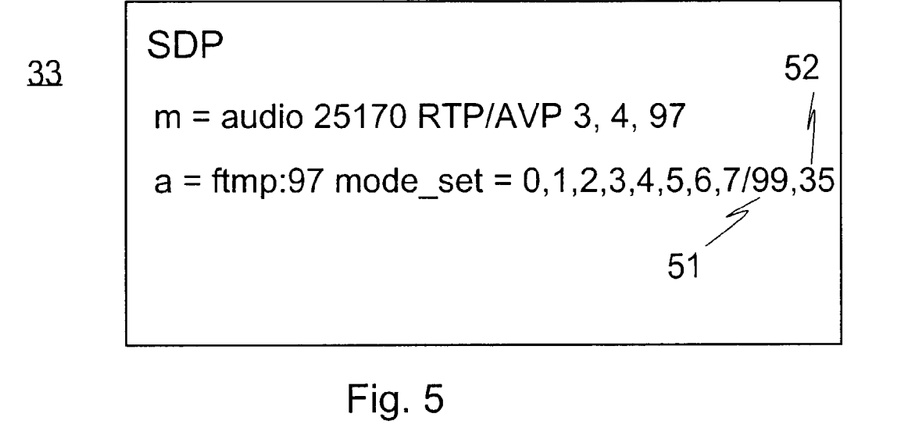
FIG. 5 shows the content of the message body of another message.

In the preferred embodiment of the invention, described in the foregoing, it is assumed that the AMR bit rate which is actually used for transmission is the same for both directions that is from UE1 to UE2 and vice versa. In one alternative embodiment it is assumed that the communication devices UE1 and UE2 may use different AMR bit rates in different directions. According to this embodiment the UE1 includes in the SDP of the SIP INVITE message two masks 51 and 52 (FIG. 5). One mask (mask 51) may be modified by the network entities concerning the supported AMR bit rates in one direction (from the UE1 to the UE2). The other mask (mask 52) may be modified by the network entities concerning the supported AMR bit rates in the other direction (from the UE2 to the UE1).

According to another embodiment of the invention the UE1 includes in the SDP of the SIP INVITE message even more masks, one for each network entity. Each network entity may now modify its own mask, when the SIP INVITE message passes through the network entity, indicating supported AMR bit rates by binary digit 1 and unsupported AMR bit rates by binary digit 0. In this way the communication devices UE1 and UE2 are able to determine the bit rates which the individual network entities support.

According to yet another embodiment of the invention the binary mask in the SIP INVITE message is presented as a hexadecimal number instead of the decimal number. Since hexadecimal numbers, in general, require less space than the corresponding decimal numbers, this leads to savings in the required space in the message. For example, the binary mask 01101011 is 107 when presented as a decimal number and is 6B when presented as a hexadecimal number.

If it is assumed that the modes/bit rates that the AMR codec supports are generally known, it is possible to omit the numbers indicating the modes/bit rates from the mode_set-list of the a-line. According to an embodiment of the invention the mode_set-list of the messages contains only the binary mask without the numbers of the modes/bit rates as follows:
a=fmtp:97 mode_set=67, wherein the decimal number 67 represents the modifiable binary mask. In this way it is possible to save space in the messages.

Figure 6:
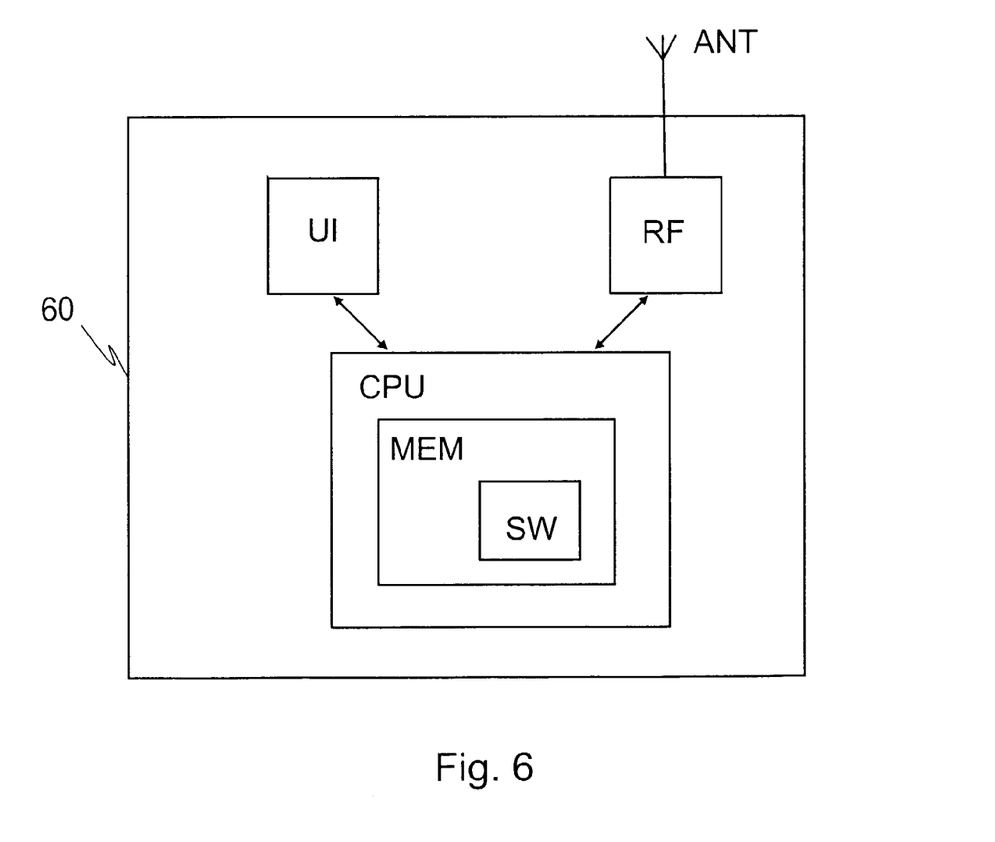
FIG. 6 shows a cellular mobile station suitable for the implementation of the invention.

The invention may be implemented by software. FIG. 6 shows a cellular mobile station 60 suitable for the implementing the invention. The mobile station 60 shown operates as the UE1. A corresponding mobile station may operate as the UE2. The mobile station 60 comprises a processing unit CPU, a radio frequency part RF and a user interface UI. The radio frequency part RF and the user interface UI are coupled to the processing unit CPU. The user interface UI comprises a display and a keyboard (not shown) to enable a user to use the mobile station 60. In addition, the user interface UI comprises a microphone and a speaker for receiving and producing audio signals. The processing unit CPU comprises a microprocessor (not shown), memory MEM and software SW. The software SW is stored in the memory MEM. The microprocessor controls, on the basis of the software SW, the operation of the mobile station 60, such as the use of the radio frequency part RF and the presenting of information in the user interface UI and the reading of inputs received from the user interface UI. The software SW comprises a WCDMA protocol stack on the basis of which a transmitter (not shown) of the radio frequency part RF transmits and a receiver (not shown) of the radio frequency part RF receives messages and other information with the aid of its antenna ANT. The codecs the support of which is negotiated reside in the mobile station 60. They may be implemented in the software SW. Another alternative is hardware implementation of the codecs (not shown).

Figure 7:
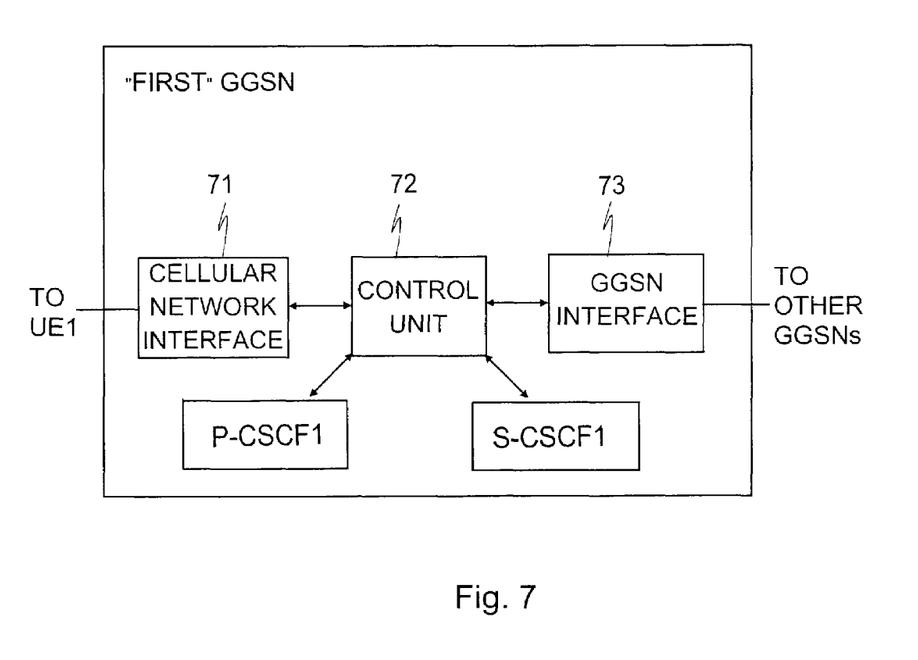
FIG. 7 shows a GGSN suitable for the implementation of the invention.

FIG. 7 shows a GGSN suitable for implementing the invention. The GGSN shown serves the UE1 and a corresponding one serves the UE2. The GGSNs may be controlled by different network operators. The GGSN comprises a cellular network interface 71, a control unit 72 and a GGSN interface 73. The cellular network interface 71 and the GGSN interface 73 are coupled to the control unit 72. The GGSN sends and receives information to and from the UE1 via the cellular network interface 71. Typically, there are several other network elements between the GGSN and the UE1. These network elements such as a base station, a base station controller and a SGSN (Serving GPRS Support Node) are well known by a person skilled in the art. The GGSN sends and receives information to and from the GGSN serving the UE2 via the GGSN interface 73. The latter GGSN then has a corresponding cellular network interface for communicating information with the UE2.

The network entities P-CSCF1, S-CSCF1, S-CSCF2 and P-CSCF2 are logical network entities implemented by software. The network entities may be implemented so as to form separate physical network elements, or they may be incorporated in some of the already existing physical network elements. In this embodiment, the network entities P-CSCF1 and S-CSCF1 are incorporated in a first GGSN and coupled with the control unit of that GGSN, and the network entities S-CSCF2 and P-CSCF2 are incorporated in a second GGSN and coupled with the control unit of that GGSN. Alternatively, the logical network entities can be located in another computer, but are linked with the GGSN.

The control unit 72 comprises a processor or another processing unit, memory and software comprising a program code. The software is stored in the memory. The processor controls, on the basis of the software, the operation of the GGSN, such as the use of the cellular network interface 71 and the GGSN interface 73. The processor of the first GGSN implements the functionality of the logical network entities P-CSCF1 and S-CSCF1, and the processor of the second GGSN implements the functionality of the logical network entities S-CSCF2 and P-CSCF2.

As to the method according to the invention, the microprocessor of the mobile station UE1 (FIG. 6) generates the SIP INVITE message containing the binary mask, by using the software SW. It forwards the SIP INVITE message to the radio frequency part RF which transmits the SIP INVITE message wirelessly to the base station of a cellular network from which the message is conveyed to the first GGSN (serving the UE1). The first GGSN receives the SIP INVITE message via the cellular network interface 71. The processor of the control unit 72 implements the modification of the m-line (removal of unsupported codecs) and the modification of the a-line (modification of the binary mask) of the SDP body according to the logical network entity P-CSCF1. Thereafter the processor of the control unit 72 implements the modification of the m-line (removal of unsupported codecs) and the modification of the a-line (modification of the binary mask) of the SDP body according to the logical network entity S-CSCF1. Here it is to be understood that although the preferred embodiment of the invention talks about forwarding the SIP INVITE message from the P-CSCF1 to the S-CSCF1 the forwarding of the message may occur, instead of a physical forwarding, by another type of forwarding where the message content just is transferred from one software process to another in one and the same device/computer.

The control unit 72 uses the GGSN interface 73 in forwarding the SIP INVITE message to the second GGSN (the one serving the UE2). The second GGSN receives the SIP INVITE message via the GGSN interface 73. The processor of the control unit 72 implements the modification of the m-line (removal of unsupported codecs) and the modification of the a-line (modification of the binary mask) of the SDP body according to the logical network entity S-CSCF2. Thereafter the processor of the control unit 72 implements the modification of the m-line (removal of unsupported codecs) and the modification of the a-line (modification of the binary mask) of the SDP body according to the logical network entity P-CSCF2. Thereafter the second GGSN forwards the SIP INVITE message to the UE2 via the cellular network interface 71.

The radio frequency part RF of the UE2 receives the SIP INVITE message via its antenna ANT (FIG. 6) and forwards the SIP INVITE message to the processing unit CPU. The microprocessor of the processing unit CPU handles the SIP INVITE message and generates the reply message. It sends the reply message via the two GGSNs to the UE1. The microprocessor of the UE1 decides the codec(s) and bit rate(s) to be used initially in the session. It generates the third message and transmits it to the UE2 via the two GGSNs.

According to the invention, it is possible to provide for the communication devices UE1 and UE2 information about network capabilities. It is possible to define which of the suggested codecs are supported and which are not supported by the network. If a particular/single codec has multiple choices/options, it is also possible to provide information about whether these choices/options are supported. It is, for example, possible to tell to the communication devices UE1 and UE2 which AMR modes/source bit rates are supported by the network. When using the binary mask indicating the supported and unsupported modes/bit rates it is possible to consume less space in the messages relating to codec negotiation.

In addition to the codec negotiation procedure presented in the preceding description the basic message structure and the use of the mask is also applicable in other codec negotiation procedures where the message sequence may deviate from the one presented. It is clear to a person skilled in the art that the messages also contain other information, than the m- and a-lines, this other information being apparent to a skilled person but not shown in the Figures. If it is evident that the UE1 supports all the same AMR modes/bit rates as the AMR codec itself, the UE1 does not necessarily have to insert the mask to the SIP INVITE message, but the mask may be inserted by the first network entity that does not support at least one of the modes/bit rates, for example the P-CSCF1. It is also possible to use some other message body than the SDP body in the messages. In this case, lines other than the m-lines and a-lines may be used, although the principle of the binary mask is still applicable. The invention is not restricted to the particular names of the messages (SIP INVITE, 183 message and FINAL SDP).

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method comprising:
    transferring from the first communication device to the second communication device, via the at least one network element that is neither the first communication device nor the second communication device, a message indicating at least one codec that the first communication device supports for a session between the first communication device and the second communication device, the message further indicating, from a plurality of operational modes of said at least one codec, first supported operational modes that the first communication device supports for the session; and
    removing unsupported operational modes of said at least one codec by the at least one network element to obtain second supported operational modes of said at least one codec, and indicating said second supported operational modes of said at least one codec in an attribute line of a session description protocol message body in the message,
    wherein the supported and unsupported operational modes are indicated with the aid of a mask having a plurality of mask elements each mask element being representative of one operational mode, wherein each of the plurality of the mask elements indicates whether the corresponding operational mode is supported wherein: the mask element taking a first value indicates that the operational mode is supported and the mask element taking a second value indicates that the operational mode is unsupported, wherein the mask comprises a binary mask and the mask elements comprise binary digits.

2. A method according to claim 1, wherein the at least one network element modifies the attribute line if the at least one network element does not support at least one of the operational modes which the attribute line indicates as being supported.

3. A method according to claim 1, wherein the first value of a mask element is a binary digit 1 and the second value is a binary digit 0.

4. A method according to claim 1, wherein the message body is a session description protocol (SDP) body of a session initiation protocol (SIP) INVITE message.

5. A method according to claim 1, wherein at least one of the communication devices is a mobile communication device.

6. A method according to claim 1, wherein the operational modes are operational modes or bit rates of an adaptive multi-rate (AMR) codec.

7. A transmitting communication device comprising:
    a transmitter configured to transmit a message to a receiving communication device via at least one network element that is neither the transmitting communication device nor the receiving communication device, the message indicating at least one codec that the transmitting communication device supports for a session between the transmitting communication device and the receiving communication device, the message further indicating, from a plurality of operational modes of said at least one codec, first supported operational modes that the transmitting communication device supports for the session, wherein the transmitting communication device is configured to:

indicate said first supported operational modes of said at least one codec in an attribute line of a session description protocol message body in the message, wherein supported and unsupported operational modes are indicated with the aid of a mask having a plurality of mask elements each mask element being representative of one operational mode, wherein each of the plurality of mask elements indicates whether the corresponding operational mode is supported, wherein the mask element taking a first value indicates that the operational mode is supported and the mask element taking a second value indicates that the operational mode is unsupported, wherein the mask comprises a binary mask and the mask elements comprise binary digits.

8. A transmitting communication device according to claim 7, wherein the operational modes are operational modes or bit rates of an adaptive multi-rate codec.

9. A transmitting communication device according to claim 7, wherein said message body is a session description protocol (SDP) body of a session initiation protocol (SIP) INVITE message.

10. A system comprising a first communication device, a second communication device and at least one network element disposed between the first communication device and the second communication device, the first communication device comprising:

a transmitter configured to transmit a message from the first communication device to the second communication device via the at least one network element, the message indicating at least one codec that the first communication device supports for a session between the first communication device and the second communication device, the message further indicating, from a plurality of operational modes of said at least one codec, first supported operational modes that the first communication device supports for the session, wherein the at least one network element is neither the first communication device nor the second communication device, wherein the at least one network element comprises:

a processing unit configured to remove unsupported operational modes of said at least one codec to obtain second supported operational modes and to indicate said second supported operational modes of said at least one codec in an attribute line of a session description protocol message body in the message, wherein the supported and unsupported operational modes are indicated with the aid of a mask having a plurality of mask elements each mask element being representative of one operational mode, wherein each of the plurality of the mask elements indicates whether the corresponding operational mode is supported wherein: the mask element taking a first value indicates that the operational mode is supported and the mask element taking a second value indicates that the operational mode is unsupported, wherein the mask comprises a binary mask and the mask elements comprise binary digits.

11. A system according to claim 10, wherein said message body comprises a session description protocol (SDP) body of a session initiation protocol (SIP) INVITE message.

12. A system according to claim 10, wherein said at least one codec comprises an adaptive multi-rate (AMR) codec.

13. A memory storing a computer program to be run in a network element for implementing a network entity, execution of the computer program by the network element resulting in operations comprising:

enabling the network entity to handle codec related information being transferred in a message between a first communication device and a second communication device, the message indicating at least one codec that the first communication device supports for a session between the first communication device and the second communication device, the message further indicating, from a group plurality of operational modes of said at least one codec, first supported operational modes that the first communication device supports for the session; and causing the network entity to remove unsupported operational modes of said at least one codec to obtain second supported operational modes and to indicate said second supported operational modes of said at least one codec in an attribute line of a session description protocol body in the message, wherein the supported and unsupported operational modes are indicated with the aid of a mask having a plurality of mask elements each mask element being representative of one operational mode, wherein each of the plurality of the mask elements indicates whether the corresponding operational mode is supported wherein: the mask element taking a first value indicates that the operational mode is supported and the mask element taking a second value indicates that the operational mode is unsupported, wherein the mask comprises a binary mask and the mask elements comprise binary digits.

14. A memory according to claim 13, wherein said message body comprises a session description protocol (SDP) body of a session initiation protocol (SIP) INVITE message.

15. A memory according to claim 13, wherein said at least one codec comprises an adaptive multi-rate (AMR) codec.

16. A network element comprising:

a network entity configured to handle a message that is being transferred from a first communication device to a second communication device via the network element, wherein the message indicates at least one codec that the first communication device supports for a session between the first communication device and the second communication device, the message further indicating, from a plurality of operational modes of said at least one codec, first supported operational modes that the first communication device supports for the session, wherein the network entity is configured to remove unsupported operational modes of said at least one codec to obtain second supported operational modes and to indicate said second supported operational modes of said at least one codec in an attribute line of a session description protocol message body in the message1 wherein the supported and unsupported operational modes are indicated with the aid of a mask having a plurality of mask elements each mask element being representative of one operational mode, wherein each of the plurality of the mask elements indicates whether the corresponding operational mode is supported wherein: the mask element taking a first value indicates that the operational mode is supported and the mask element taking a second value indicates that the operational mode is unsupported, wherein the mask comprises a binary mask and the mask elements comprise binary digits.

17. A network element according to claim 16, wherein the network entity is configured to modify the attribute line if the network entity does not support at least one of the operational modes which the codec related information indicates are indicated as being supported.

18. A network element according to claim 16, wherein the operational modes are operational modes or bit rates of an adaptive multi-rate codec.

19. A network element according to claim 16, wherein the first value is a binary digit 1 and the second value is a binary digit 0.

20. A network element according to claim 16, wherein said message body is a session description protocol (SDP) body of a session initiation protocol (SIP) INVITE message.

21. A transmitting communication device according to claim 16, wherein the first value is a binary digit 1 and the second value is a binary digit 0.

* * * * *

UNITED STATES PATENT AND TRADEMARK OFFICE
CERTIFICATE OF CORRECTION

PATENT NO. : 7,468,983 B1 Page 1 of 1
APPLICATION NO. : 10/153548
DATED : December 23, 2008
INVENTOR(S) : Requena et al.

It is certified that error appears in the above-identified patent and that said Letters Patent is hereby corrected as shown below:

In The Claims:

In Claim 1: Column 14, line 16, delete "the".

In Claim 2: Column 14, line 44, delete "w herein" and replace with --wherein--.

In Claim 13: Column 16, line 17, delete "group".

In Claim 16: Column 16, line 59, delete "message1" and replace with --message,--.

Signed and Sealed this

Fourteenth Day of April, 2009

JOHN DOLL
*Acting Director of the United States Patent and Trademark Office*